United States Patent [19]

Chieger

[11] 4,049,285

[45] Sept. 20, 1977

[54] ALUMINUM PLATFORM TRAILER

[75] Inventor: George Chieger, Birmingham, Mich.

[73] Assignee: Fruehauf Corporation, Detroit, Mich.

[21] Appl. No.: 634,356

[22] Filed: Nov. 24, 1975

[51] Int. Cl.$^2$ ............................................ B62D 21/02
[52] U.S. Cl. ............................. 280/106 T; 296/28 M
[58] Field of Search ................... 296/28 M; 280/106 T

[56] References Cited

U.S. PATENT DOCUMENTS

| | | | |
|---|---|---|---|
| 1,696,039 | 12/1928 | Kane | 52/693 |
| 2,257,365 | 9/1941 | Barrett | 296/28 M |
| 2,447,471 | 8/1948 | Wagner | 296/28 M |
| 2,478,993 | 8/1949 | Wing | 296/28 M X |
| 2,631,900 | 3/1953 | Simpson | 52/693 |
| 2,753,018 | 7/1956 | Curell | 296/28 M X |
| 3,080,021 | 3/1963 | Muir | 52/460 |
| 3,132,604 | 5/1964 | Collins et al. | 296/28 M X |
| 3,185,112 | 3/1965 | Johnston | 296/28 M X |
| 3,185,519 | 5/1965 | Turnbull et al. | 280/106 T X |
| 3,195,477 | 7/1965 | Jones et al. | 296/28 M X |
| 3,319,393 | 5/1967 | Tantlinger et al. | 296/28 M X |
| 3,361,401 | 1/1968 | Hanifan | 296/28 M X |
| 3,705,732 | 12/1972 | Marinelli | 280/106 T |

Primary Examiner—Joseph F. Peters, Jr.
Assistant Examiner—Donn McGiehan
Attorney, Agent, or Firm—Harness, Dickey & Pierce

[57] ABSTRACT

A platform trailer comprises a plurality of extruded aluminum floor boards, which are approximately four inches in thickness centrally of the trailer. The floor boards transversely outward of the center portion taper to a thickness of approximately 2½ inches at the side edges of the trailer platforms. The floor boards have top and bottom panels which are joined by angularly disposed webs. The floor boards have mating welded edges that are joined to form a continuous horizontal substantially planar platform. A floor board spaced inwardly from each side edge of the platform has a downwardly extending web portion on the bottom thereof to which the web portion of an inverted T-shaped longitudinal frame member is secured. Pockets are welded in openings through the top and bottom panels of the transversely outermost floor boards for the acceptance of stakes in any desired longitudinally spaced relation. The transversely outermost floor boards are provided with openings spaced along the length thereof for access to a wood filler member secured therein to permit nailing to the platform.

8 Claims, 3 Drawing Figures

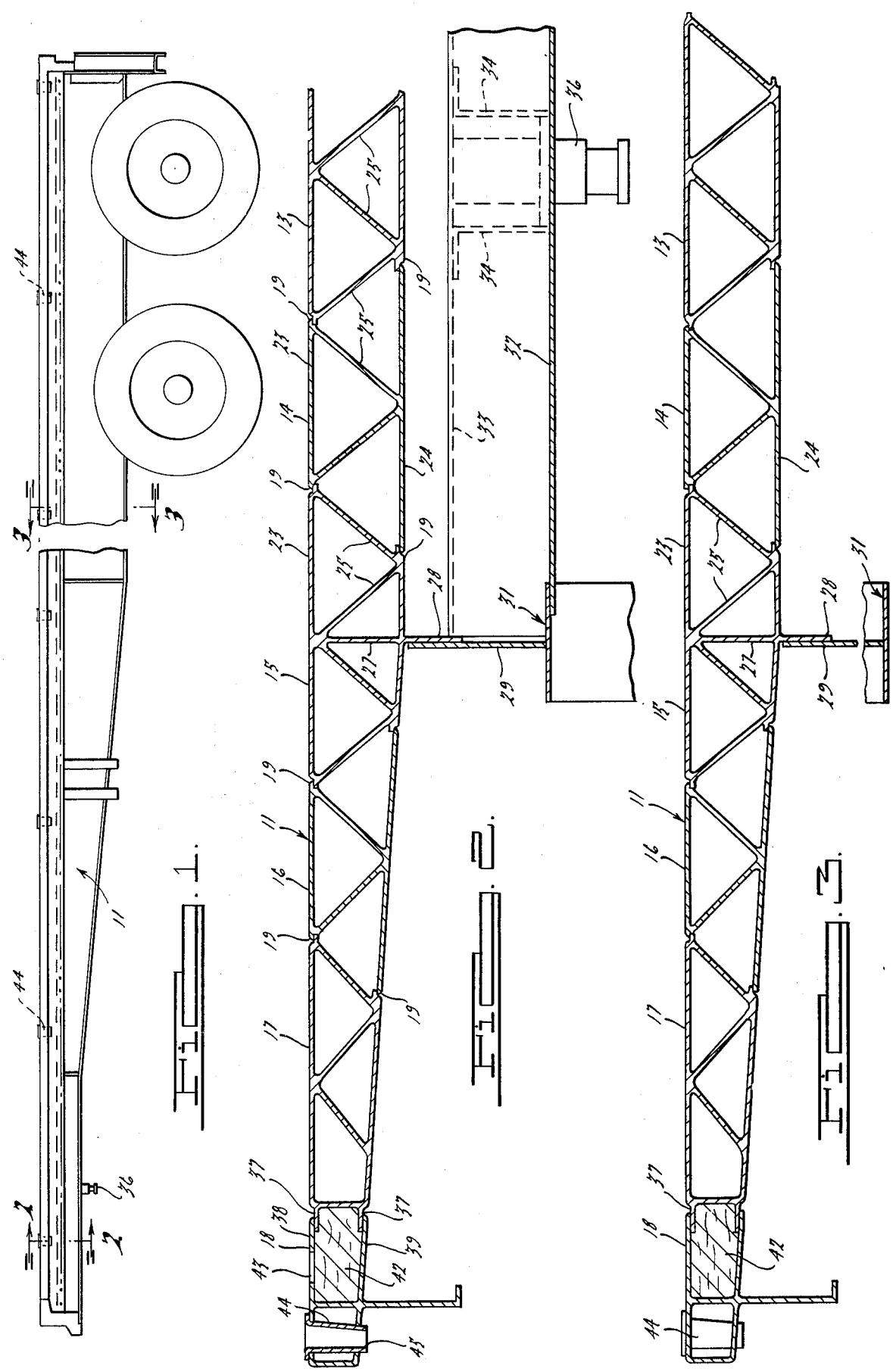

ALUMINUM PLATFORM TRAILER

BACKGROUND OF THE INVENTION

The invention pertains to a platform for a trailer composed of boards which are extruded from aluminum with the top and bottom panel portions joined by angularly disposed webs. The boards are transversely disposed, abutted against each other and welded at the edges to provide top and bottom panels which are parallel at the central portion and with the bottom panel sloping upwardly from the central portion toward the outer edges. The edge of the central portion has vertically disposed webs which extend therebelow and which are joined to inverted T-shaped elements to form supporting frame members which are in unit relation to the platform support thereabove.

RELATED APPLICATION

Reference may be had to application Ser. No. 449,638, filed Mar. 11, 1974, for AIR CARGO CONTAINER which was refiled as a continuation application Ser. No. 615,214, filed on Sept. 19, 1975 which is assigned to the assignee of the present invention.

SUMMARY OF THE INVENTION

A platform trailer is constructed of extruded aluminum floor boards having top and bottom panels and angularly disposed webs therebetween. The floor boards are of two types which are alternately disposed and welded together along the abutting edges thereof. The boards are transversely disposed with the longitudinal portion of the platform provided with downwardly extending web portions to which a central web of inverted T-shaped frame members are secured. The floor boards, in conjunction with the inverted T-shaped frame members, define an I-beam. A kingpin is secured to cross members at the front end of the composite platform and wheels are mounted at the rear thereof in the conventional manner.

BRIEF DESCRIPTION OF THE DRAWINGS

FIG. 1 is a broken side elevation of a platform trailer embodying features of the present invention;

FIG. 2 is an enlarged broken transverse sectional view of one-half of the platform illustrated in FIG. 1, taken on the line 2—2 thereof, and FIG. 3 is an enlarged broken transverse sectional view of one-half of the platform illustrated in FIG. 1, taken on the line 3—3 thereof.

DESCRIPTION OF THE PREFERRED EMBODIMENT

A trailer platform 11 is constructed from a plurality of extruded aluminum floor boards, 13, 14, 15, 16, 17 and 18. The floor boards 14 are of one type while the floor boards 13 are of the other type. The boards 14 to 18 are secured together on the lefthand side of the platform portion and, when inverted end for end, on the righthand side thereof. Edges 19 of the boards 13—18 are welded to one another. The half views illustrated in FIGS. 2 and 3 indicate the construction of both sides of the platform 11.

The boards 13—18 have top panels 23 and bottom panels 24 joined together by diagonal webs 25 to provide resistance against crushing and bending loads.

In accordance with the present invention, a vertical web 27 on the boards 15 have a portion 28 extending below the panel 24 which is welded to a web portion 29 of an inverted T-shaped frame member 31. Thus, the frame member 31 in conjunction with the platform 11 defines an I-beam.

A series of transverse members 32, 33 and 34 form a support structure for a kingpin 36 at the forward central portion of the platform 11 for releasable connection to a tractor in the conventional manner.

The floor board 17 has spaced extending flanges 37 which are welded to flanges 38 and 39 of the box section edge board 18. Before the welds are made, a length of wood 42 is inserted between the flanges 38 and 39 so as to be encased therebetween. A plurality of openings 43 are provided along the top flange 38 of the board 18 through which nails can be driven for securing cargo to the platform 11. The edge boards 18 are provided with hollow stake supporting sockets 44 having a tapered aperture 45 therethrough. The stake supporting sockets 44 are shown in the side view of FIG. 1 as being spaced along the outer edges of the platform 11.

From the foregoing, it should be apparent that the platform 11 forms the top flange of an I-beam as opposed to prior art constructions wherein the platform is secured to a discrete frame member of I-cross section.

What is claimed:

1. A platform trailer having a platform constructed from a plurality of floor boards at least two of which are of different types of extrusions joined in alternately disposed relation, the floor board of one type having spaced top and bottom panels joined by angularly disposed webs forming a triangle, the base of which forms said top panel and the apex therebelow being connected to the center of said bottom panel, the other type of floor board has top and bottom panels constructed from a central upright triangle and two inverted triangles transversely outward thereof with the side webs of said inverted triangles forming triangles with the webs of said one type of floor boards to have the top and bottom panels of the platform spaced by the angularly disposed webs when the said one and other types of floor boards are in aligned abutted, welded relation.

2. A platform trailer as recited in claim 1, wherein the alternate sides of the triangles are substantially in parallel relation to each other.

3. A platform trailer as recited in claim 2, wherein the adjacent sides meet to form angles of substantially 90°.

4. A platform trailer as recited in claim 1, wherein the central portion of the platform has top and bottom panels disposed in parallel relation to each other.

5. A platform trailer as recited in claim 4, wherein the bottom panels of the floor boards which are disposed transversely outward of the center portion slope upwardly toward the outer edges.

6. A platform trailer as recited in claim 5, wherein the transversely outermost floor boards of the platform have the top and bottom panels joined by a vertical web having two parallel outwardly extending flanges.

7. A platform trailer as recited in claim 4, wherein the endmost triangles at the central portion of the platform where the top and bottom panels are parallel, each having a vertically disposed web dividing the two triangles in equal parts with said vertical webs extending downwardly below the bottom panel of the floor boards, and a pair of inverted T-shaped elements each of which is joined to a vertical web extending below said triangles to form a pair of spaced supporting frame members at the spaced sides of the central portion of the platform.

8. A platform trailer as recited in claim 6, wherein the transverse outermost floor boards further comprises an inwardly presenting channel section the sides of which are engaged with the transversely outward extending flanges at the outer side of the sidemost floor boards, and a length of wood within said channel section which has openings in the top side through which nails may be driven into the wood.

* * * * *